(12) United States Patent
Choi et al.

(10) Patent No.: US 10,667,242 B2
(45) Date of Patent: May 26, 2020

(54) METHOD AND DEVICE FOR FORMING CONTROL SIGNAL COMPRISING CONTROL FIELD IN WIRELESS LAN SYSTEM

(71) Applicant: LG ELECTRONICS INC., Seoul (KR)

(72) Inventors: Jinsoo Choi, Seoul (KR); Dongguk Lim, Seoul (KR); Hangyu Cho, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/525,006

(22) PCT Filed: Aug. 10, 2016

(86) PCT No.: PCT/KR2016/008767
§ 371 (c)(1),
(2) Date: May 5, 2017

(87) PCT Pub. No.: WO2017/026784
PCT Pub. Date: Feb. 16, 2017

(65) Prior Publication Data
US 2018/0288754 A1 Oct. 4, 2018

Related U.S. Application Data

(60) Provisional application No. 62/202,922, filed on Aug. 10, 2015.

(51) Int. Cl.
*H04W 72/04* (2009.01)
*H04L 27/26* (2006.01)
(Continued)

(52) U.S. Cl.
CPC ....... *H04W 72/0406* (2013.01); *H04L 5/0064* (2013.01); *H04L 5/0091* (2013.01);
(Continued)

(58) Field of Classification Search
CPC ......... H04W 72/0406; H04W 72/0453; H04W 84/12
(Continued)

(56) References Cited

U.S. PATENT DOCUMENTS

2016/0285526 A1* 9/2016 Hedayat ............... H04B 7/0452
2016/0330000 A1* 11/2016 Lee ....................... H04L 5/0007
(Continued)

FOREIGN PATENT DOCUMENTS

| JP | 2013509106 | 3/2013 |
|---|---|---|
| JP | 2013513284 | 4/2013 |

(Continued)

OTHER PUBLICATIONS

U.S. Appl. No. 62/204,086; Xiaogang Chen et al. Device, Method and System using HE-SIGB spatial resource indication, filed Aug. 12, 2015 (Year: 2015).*
(Continued)

*Primary Examiner* — Mark H Rinehart
*Assistant Examiner* — Kokou R Detse
(74) *Attorney, Agent, or Firm* — Lee Hong Degerman Kang & Waimey

(57) ABSTRACT

Provided is an example related to a control field which is used for PPDU in a wireless LAN system supporting a plurality of RUs. An additional identifier can be comprised in the control field for PPDU. An identifier value comprised in the control field is preferably determined on the basis of whether or not only one RU corresponding to the full bandwidth of a transmission frequency band is arranged. Comprising of information for allocation of RU of the PPDU can be determined on the basis of the identifier value comprised in the control field.

18 Claims, 20 Drawing Sheets

(51) Int. Cl.
*H04L 5/00* (2006.01)
*H04W 84/12* (2009.01)

(52) U.S. Cl.
CPC ......... *H04L 27/2602* (2013.01); *H04W 72/04* (2013.01); *H04W 72/0453* (2013.01); *H04L 5/0023* (2013.01); *H04W 84/12* (2013.01)

(58) Field of Classification Search
USPC ........................................................ 370/329
See application file for complete search history.

(56) References Cited

U.S. PATENT DOCUMENTS

| | | | |
|---|---|---|---|
| 2017/0048844 A1* | 2/2017 | Chen ................. | H04W 72/0413 |
| 2017/0181136 A1* | 6/2017 | Bharadwaj ............ | H04W 72/12 |

FOREIGN PATENT DOCUMENTS

| | | |
|---|---|---|
| WO | 2011050324 | 4/2011 |
| WO | 2011068387 | 6/2011 |
| WO | 2015016684 | 2/2015 |
| WO | 2015068968 | 5/2015 |
| WO | 2015076856 | 5/2015 |

OTHER PUBLICATIONS

PCT International Application No. PCT/KR2016/008767, International Search Report dated Nov. 2, 2016, 2 pages.
Kwon, et al., "SIG-B Field for HEW PPDU", IEEE 802.11-15/0805r2, Jul. 13, 2015, 11 pages.
He, et al., "PPDU Format for IEEE 802.11aj (45GHz)", 5-15-1082-05-00aj, May 19, 2015, 8 pages.
Japan Patent Office Application No. 2017-522008, Office Action dated May 1, 2018, 3 pages.
Stacey, R., "Specification Framework for TGax", doc.: IEEE 802.11-15/0132r7, IEEE P802.11 Wireless LANs, Jul. 2015, 13 pages.
European patent application No. 16835424.9, European search report dated Feb. 14, 2019, 7 pages.
Apple et al., "HE-SIG-B Structure," IEEE 802.11-15/0821r2, Jul. 11, 2015, 19 pages.
Korean Intellectual Property Office Application No. 10-2017-7008541, Office Action dated Nov. 26, 2019, 6 pages.
Liu et al., "SIG-A Structure in 11ax Preamble," IEEE 802.11-15/0822r2, 17 pages.
Azizi et al., "OFDMA Numerology and Structure," IEEE 802.11-15/0330r1, 38 pages.

\* cited by examiner

FIG. 1
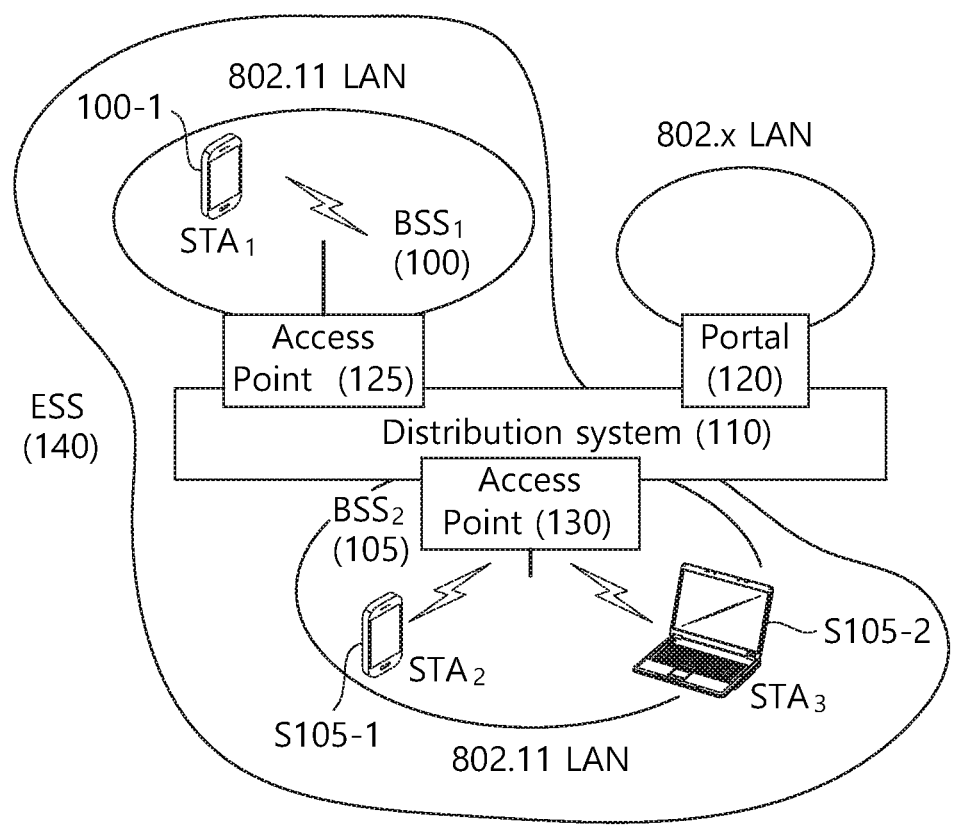
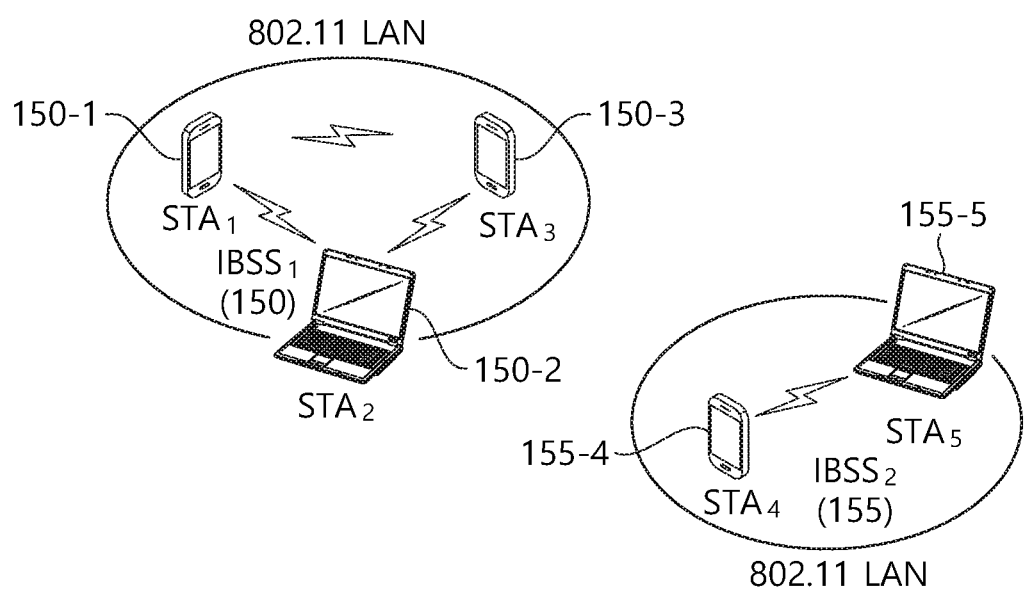

METHOD AND DEVICE FOR FORMING CONTROL SIGNAL COMPRISING CONTROL FIELD IN WIRELESS LAN SYSTEM

CROSS-REFERENCE TO RELATED APPLICATIONS

This application is the National Stage filing under 35 U.S.C. 371 of International Application No. PCT/KR2016/008767, filed on Aug. 10, 2016, which claims the benefit of U.S. Provisional Application No. 62/202,922, filed on Aug. 10, 2015, the contents of which are all hereby incorporated by reference herein in their entirety.

BACKGROUND OF THE INVENTION

Technical Field

The present specification relates to a technique for transmitting and receiving data in wireless communication, and more particularly, to a method and apparatus for configuring a control signal including a control field in a wireless local area network (LAN) system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

The present specification proposes a method of configuring a control field of a physical layer (PHY) protocol data unit (PPDU) for a wireless local area network (WLAN) system.

The present specification proposes a control field of a PPDU which exhibits improved performance regarding resource allocation.

A method according to an embodiment of the present specification is used in a wireless local area network (WLAN) using a resource unit (RU) corresponding to a predetermined frequency band. A plurality of fields of a PPDU are delivered to at least one receiving station or user station according to the RU.

A method according to an embodiment of the present specification includes: configuring a PPDU generated for a plurality of receiving devices and containing a first control field, a second control field, and a data field; and transmitting the PPDU to the plurality of receiving devices through a transmission frequency band.

The first control field may include control information required to interpret the PPDU.

The first control field may include a control identifier indicating whether a single RU corresponding to a full bandwidth of the transmission frequency band is allocated.

The second control field may include identification information for the plurality of receiving devices.

The second control field may include allocation information for the RU, and if the control identifier indicates that the single RU corresponding to the full bandwidth is allocated, the second control field may not include the allocation information for the RU.

The method may be implemented through a transmitting device for transmitting a PPDU or a receiving device for configuring the PPDU.

ADVANTAGEOUS EFFECTS

An embodiment of the present specification proposes an example in which allocation information for a resource unit (RU) is effectively delivered through a newly proposed control field.

An embodiment of the present specification proposes an example of achieving improved performance through a control field designed by considering a frequency band.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
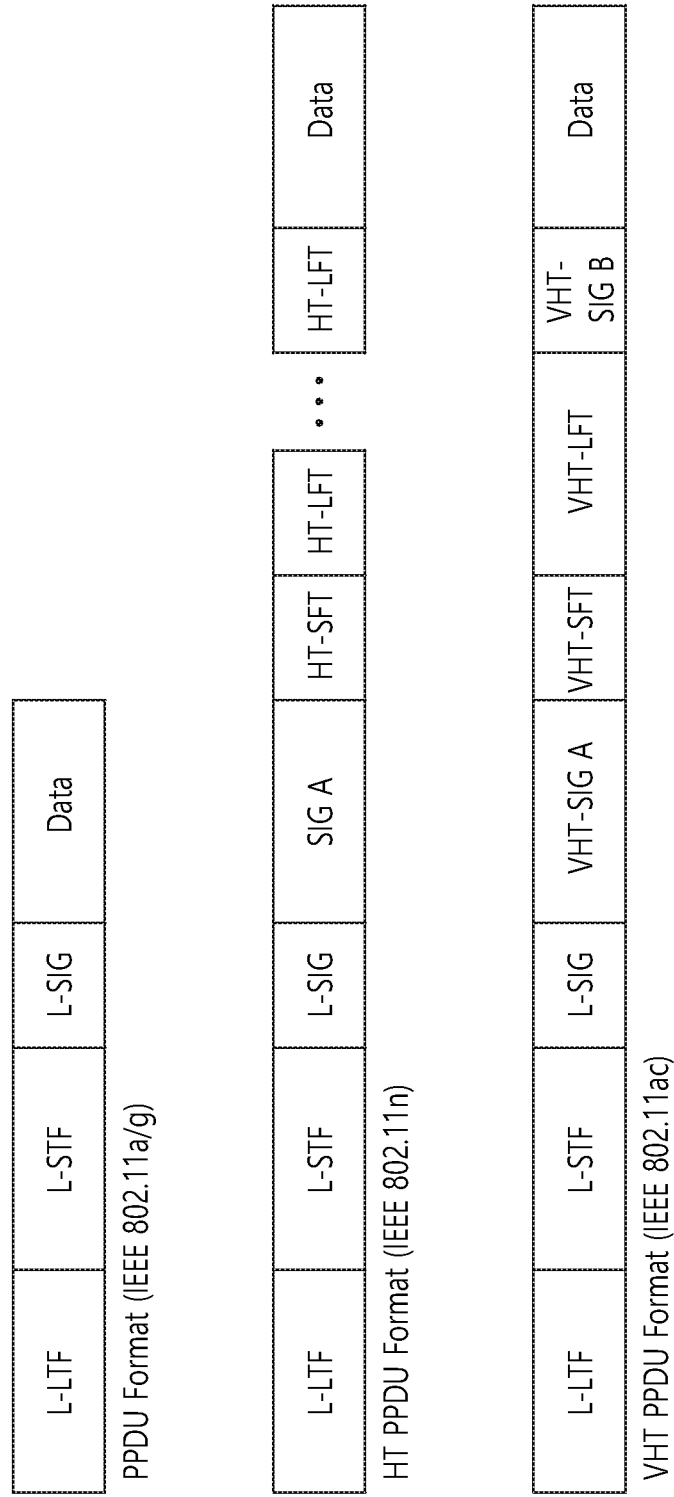
FIG. 2 is a diagram illustrating an example of a physical layer (PHY) protocol data unit (PPDU) used in an institute of electronic and electronics engineers (IEEE) standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
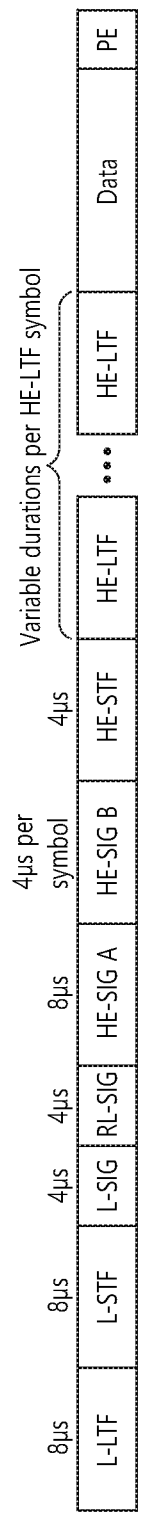
FIG. 3 is a diagram illustrating an example of a high efficiency (HE) PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
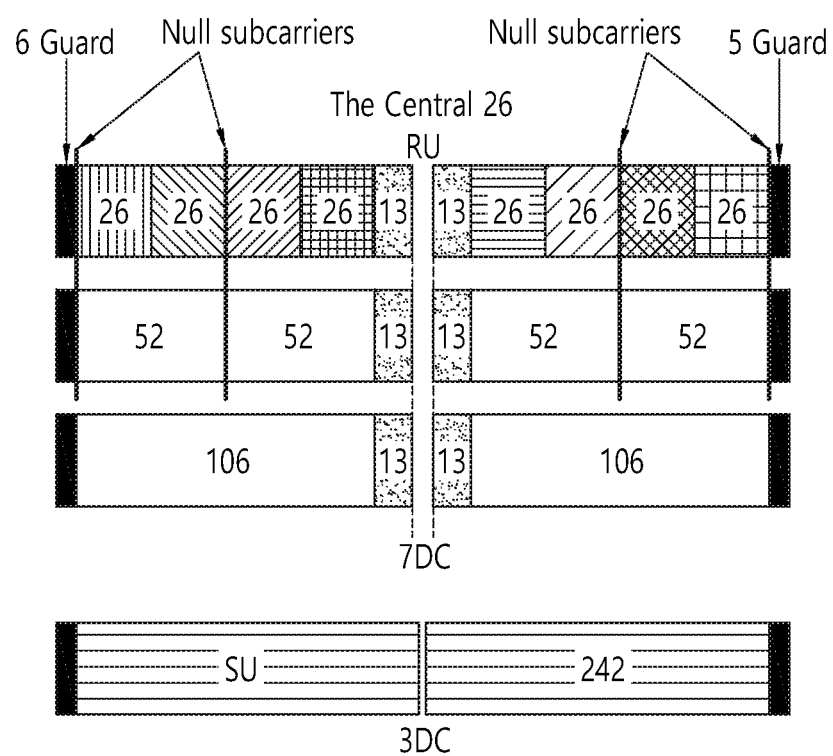
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated with respect to the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
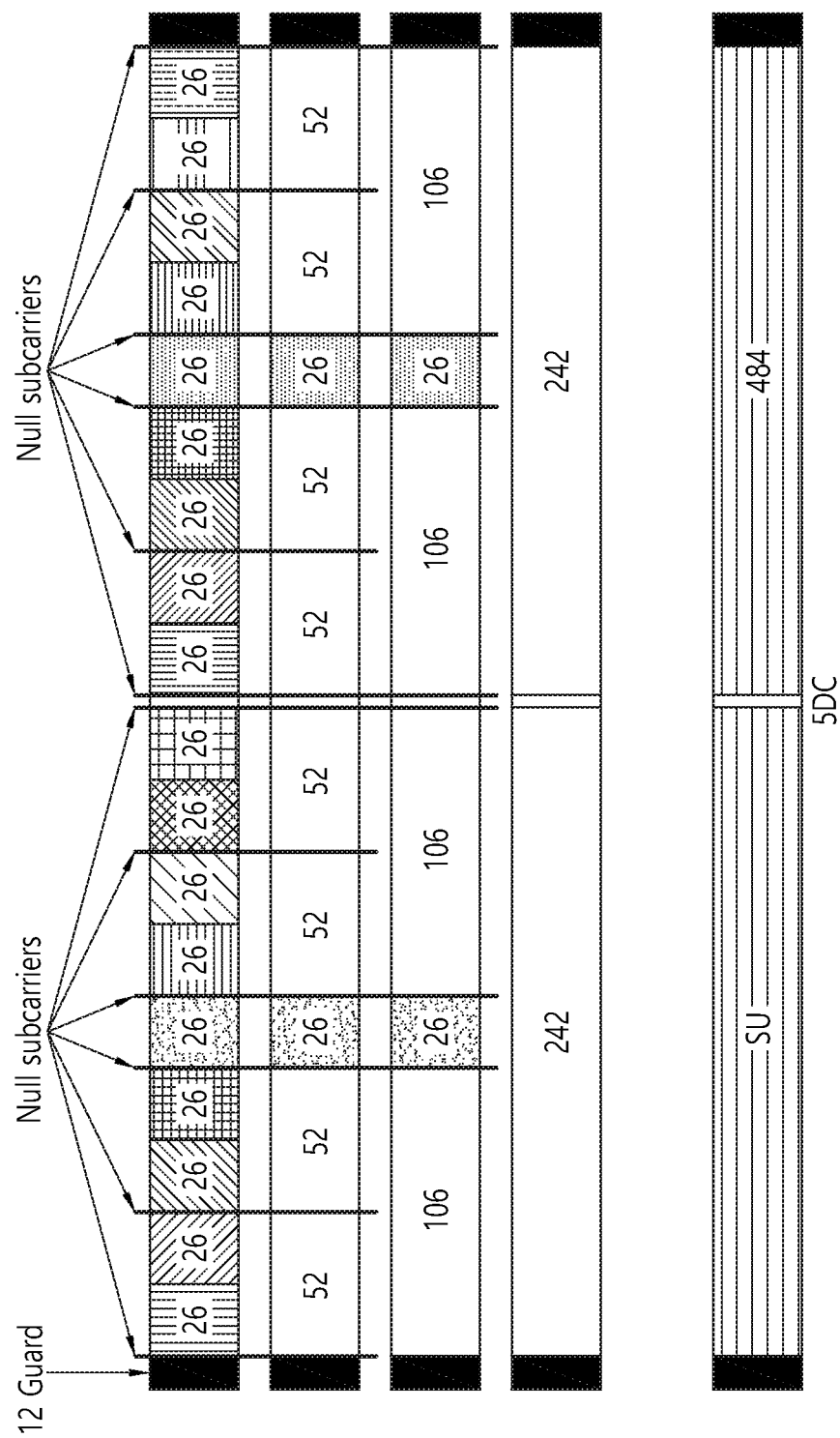
FIG. 5 is a diagram illustrating a layout of RUs used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
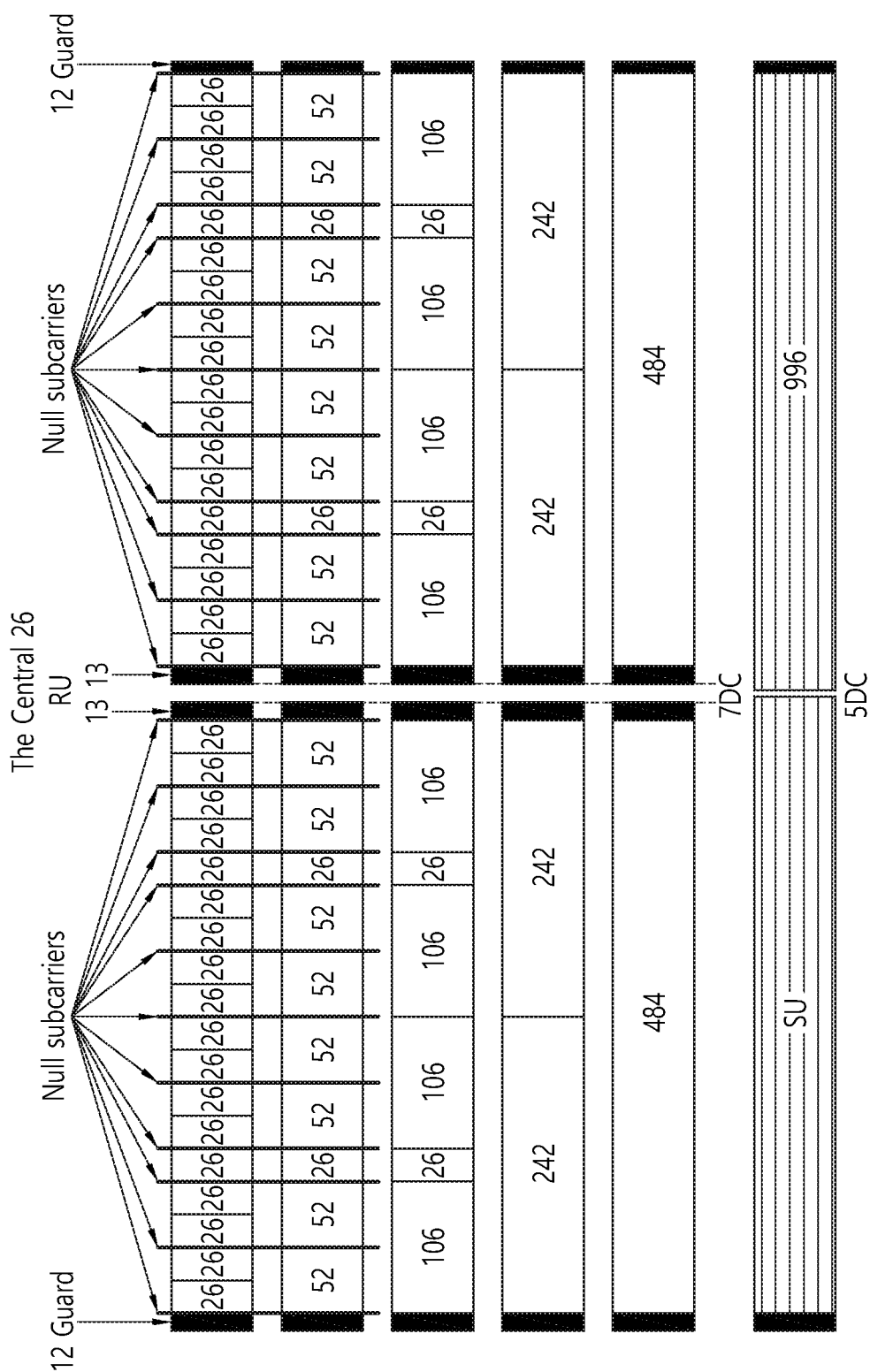
FIG. 6 is a diagram illustrating a layout of RUs used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Meanwhile, the detailed number of RUs may be modified similarly to one example of each of FIG. 4 or 5.

Figure 7:
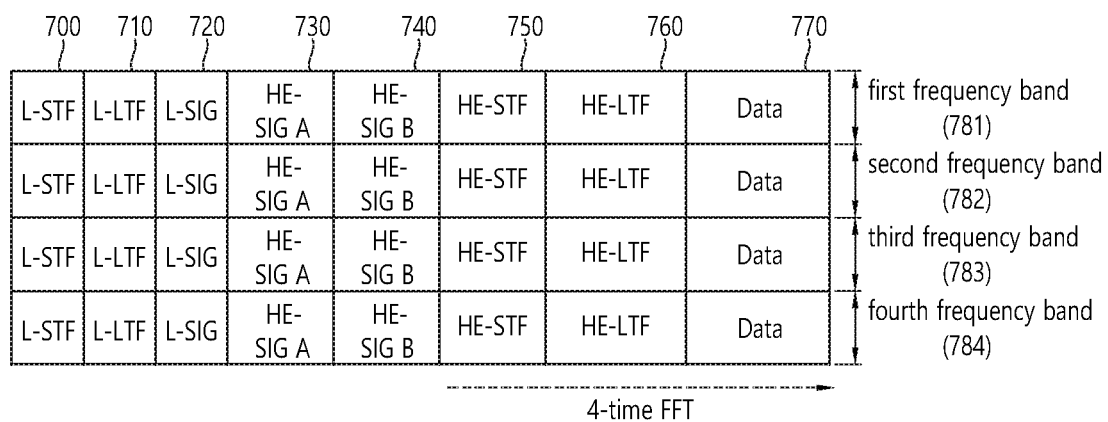
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
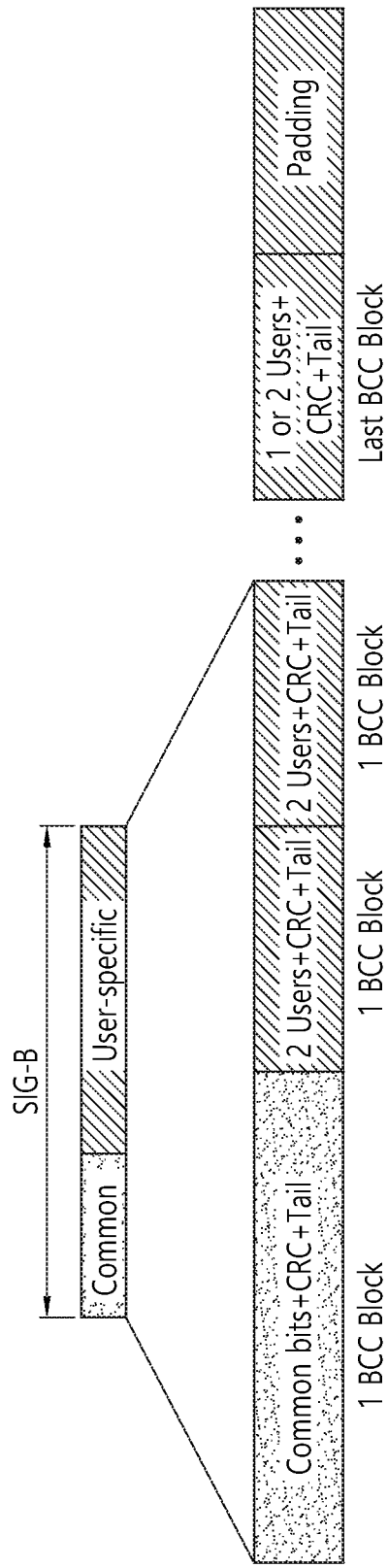
FIG. 8 is a block diagram illustrating one example of high efficiency signal B (HE-SIG-B) according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
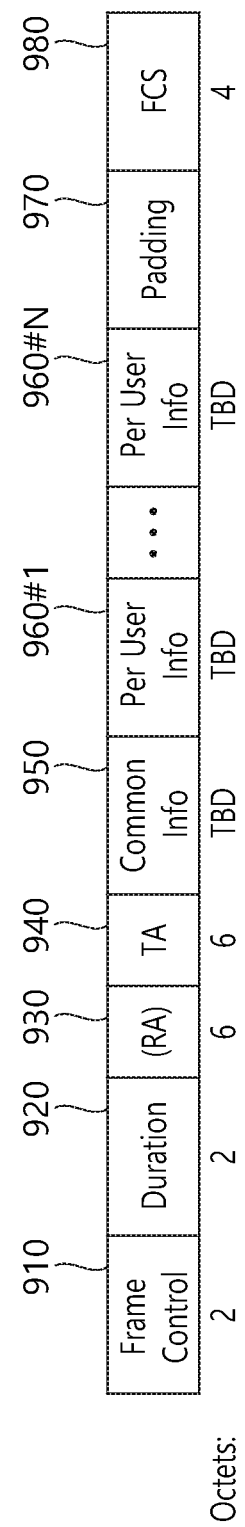
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame. For example, information for controlling the content of a field indicating a length of an L-SIG field of an uplink PPDU transmitted in response to the trigger frame or an SIG-A (i.e., HE SIG-A field) of the uplink PPDU transmitted in response to the trigger frame may be included. Further, information regarding a length of a CP of the uplink PPDU transmitted in response to the trigger frame or information regarding a length of an LTF field may be included as common control information.

In addition, per user information fields 960#1 to 960# N corresponding to the number of receiving STAs for receiving the trigger frame of FIG. 9 are preferably included. The per user information field may be called an "RU allocation field".

In addition, the trigger frame of FIG. 9 may include a padding field 970 and a frame check sequence field 980.

Each of the per user information fields 960#1 to 960#N shown in FIG. 9 preferably includes a plurality of sub-fields.

Figure 10:
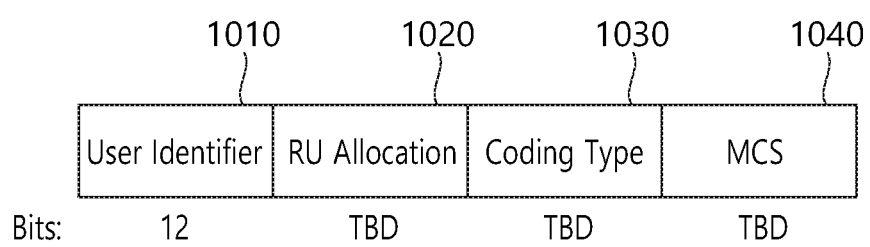
FIG. 10 illustrates an example of a sub-field included in a per user information field.

FIG. 10 illustrates an example of a sub-field included in a per user information field. Some parts of the sub-field of FIG. 10 may be omitted, and extra sub-fields may be added. Further, a length of each of the sub-fields shown herein may change.

A user identifier field 1010 of FIG. 10 indicates an identifier of an STA (i.e., a receiving STA) corresponding to per user information. An example of the identifier may be all or some parts of an AID.

In addition, an RU allocation field 1020 may be included. That is, if a receiving STA identified by the user identifier field 1010 transmits an uplink PPDU in response to the trigger frame of FIG. 9, the uplink PPDU is transmitted through an RU indicated by the RU allocation field 1020. In this case, the RU indicated by the RU allocation field 1020 preferably indicates the RU shown in FIG. 4, FIG. 5, and FIG. 6. A configuration of the RU allocation field 1020 is described below in detail.

The sub-field of FIG. 10 may include a coding type field 1030. The coding type field 1030 may indicate a coding type of an uplink PPDU transmitted in response to the trigger frame of FIG. 9. For example, if BCC coding is applied to the uplink PPDU, the coding type field 1030 may be set to '1', and if LDPC coding is applied, the coding type field 1030 may be set to '0'.

In addition, the sub-field of FIG. 10 may include an MCS field 1040. The MCS field 1040 may indicate an MCS scheme applied to the uplink PPDU transmitted in response to the trigger frame of FIG. 9. For example, if BCC coding is applied to the uplink PPDU, the coding type field 1030 may be set to '1', and if LDPC coding is applied, the coding type field 1030 may be set to '0'.

Hereinafter, the present specification proposes an example of improving a control field included in a PPDU. The control field improved by the present specification includes a first control field including control information required to interpret the PPDU and a second control field including control information for demodulating a data field of the PPDU. The first and second control fields may be various fields. For example, the first control field may be the HE-SIG-A 730 shown in FIG. 7, and the second control field may be the HE-SIG-B 740 shown in FIG. 7 and FIG. 8.

Hereinafter, an example of improving the first and second control fields is described in detail.

The following example proposes a control identifier inserted to the first control field or the second control field. The control identifier may have various sizes, and for example, may be implemented as 1-bit information.

If 20 MHz transmission is performed for example, the control identifier (e.g., 1-bit identifier) may indicate whether a 242-RU is allocated. An RU having various sizes may be used as shown in FIG. 4 to FIG. 6. The RU may be classified roughly into two types of RUs. For example, all RUs shown in FIG. 4 to FIG. 6 may be classified into an 26-type RU and a 242-type RU. For example, the 26-type RU may include a 26-RU, a 52-RU, and a 106-RU, and the 242-type RU may include a 242-RU, a 484-RU, and an RU having a larger size than the previous one.

The control identifier (e.g., 1-bit identifier) may indicate that the 242-type RU is used. That is, it may indicate that the 242-RU is included or the 484-RU or a 996-RU is included. If a transmission frequency band at which a PPDU is transmitted is a 20 MHz band, the 242-RU is a single RU corresponding to a full bandwidth of the transmission frequency band (i.e., 20 MHz). Accordingly, the control identifier (e.g., 1-bit identifier) may indicate whether the single RU corresponding to the full bandwidth of the transmission frequency band is allocated.

For example, if the transmission frequency band is a 40 MHz band, the control identifier (e.g., 1-bit identifier) may indicate whether a single RU corresponding to a full bandwidth (i.e., 40 MHz band) of the transmission frequency band is allocated. That is, whether the 484-RU is allocated for 40 MHz transmission may be indicated.

For example, if the transmission frequency band is an 80 MHz band, the control identifier (e.g., 1-bit identifier) may indicate whether a single RU corresponding to a full bandwidth (e.g., 80 MHz band) of the transmission frequency band is allocated. That is, whether the 996-RU is allocated for 80 MHz transmission may be indicated.

Various technical advantages can be achieved through the control identifier (e.g., 1-bit identifier).

First, through the control identifier (e.g., 1-bit identifier), it is possible to omit allocation information of the RU if a single RU corresponding to a full bandwidth of a transmission frequency band is allocated. That is, since only one RU is allocated to the full bandwidth of the transmission frequency band instead of a plurality of RUs, it is possible to omit the allocation information of the RU.

In addition, it can also be utilized as signaling for full bandwidth MU-MIMO. For example, if a single RU is allocated across a full bandwidth of the transmission frequency band, multiple users may be allocated to the single RU. That is, although a signal for each user is not divided in time and space, signals for several users may be multiplexed to the same single RU by using other schemes (e.g., spatial multiplexing). Accordingly, the control identifier (e.g., 1-bit identifier) may also be used to indicate whether to use the aforementioned full bandwidth MU-MIMO.

Figure 11:
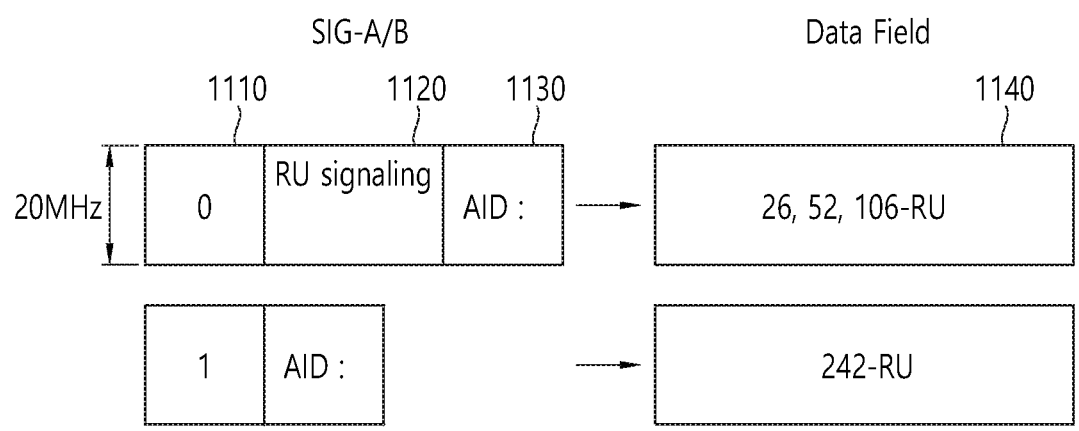
FIG. 11 is a block diagram illustrating an example of a control field and data field configured according to the present embodiment.

FIG. 11 is a block diagram illustrating an example of a control field and data field configured according to the present embodiment.

A left block of FIG. 11 indicates information included in a first and/or second control field of a PPDU, and a right block of FIG. 11 indicates information included in a data field of the PPDU. The PPDU related to FIG. 11 may be a PPDU for a multi-user, that is, a plurality of receiving devices. More specifically, a field configuration may vary for the multi-user and the single user, and the example of FIG. 11 may be a PPDU for the multi-user.

Although it is shown that the example of FIG. 11 is used for 20 MHz transmission, a bandwidth of a transmission frequency band is not limited thereto, and thus the present invention is also applicable to 40 MHz, 80 MHz, and 160 MHz transmission.

As shown in the left block of FIG. 11, the control identifier (e.g., 1-bit identifier) may be included in the first and/or second control fields. For example, if a control identifier 1110 is included in the first control field, information regarding allocation information 1120 for an RU may be included in the second control field. Further, identification information 1130 of a receiving device for receiving the PPDU of FIG. 11 may be included in the second control field. The identification information 1130 of the receiving device may indicate to which receiving device a data field 1140 corresponding to the second control field is allocated, and for example, may be implemented with an AID.

As shown in FIG. 11, the allocation information for the RU may be omitted in the second control field according to the control identifier (e.g., 1-bit identifier). For example, if the control identifier is set to "1", the allocation information 1120 for the RU may be omitted in the second control field, and the identification information 1130 of the receiving device may be included. Further, if the control identifier is set to "0", the allocation information 1120 for the RU may be included in the second control field, and the identification information 1130 of the receiving device may also be included.

The allocation information 1120 for the RU of FIG. 11 may be included in the common field of the SIG-B shown in FIG. 8, and the identification information 1130 of FIG. 11 may be included in the user-specific field of the SIG-B shown in FIG. 8.

In addition, referring to FIG. 11, common information such as RU signaling information, stream allocation related information, or the like for a user may be included in the common field of the SIG-B, and common information for all users receiving the PPDU of FIG. 11 may be included. If the aforementioned allocation information 1120 for the RU is omitted, there is a technical advantage in that an overhead is decreased.

According to another example, in case of using 20 MHz transmission, since 242-RU allocation may be regarded as single user (SU) transmission, the aforementioned control identifier (e.g., 1-bit identifier) may be omitted. In this case, a different operation may be performed according to a first control field (e.g., HE-SIG-A) SU/MU identification field. That is, if the SU/MU identification field included in the first control field indicates MU transmission, an example is possible in which the control identifier is omitted and only a 26-type RU is allocated.

Hereinafter, another example of the present embodiment is described.

Figure 12:
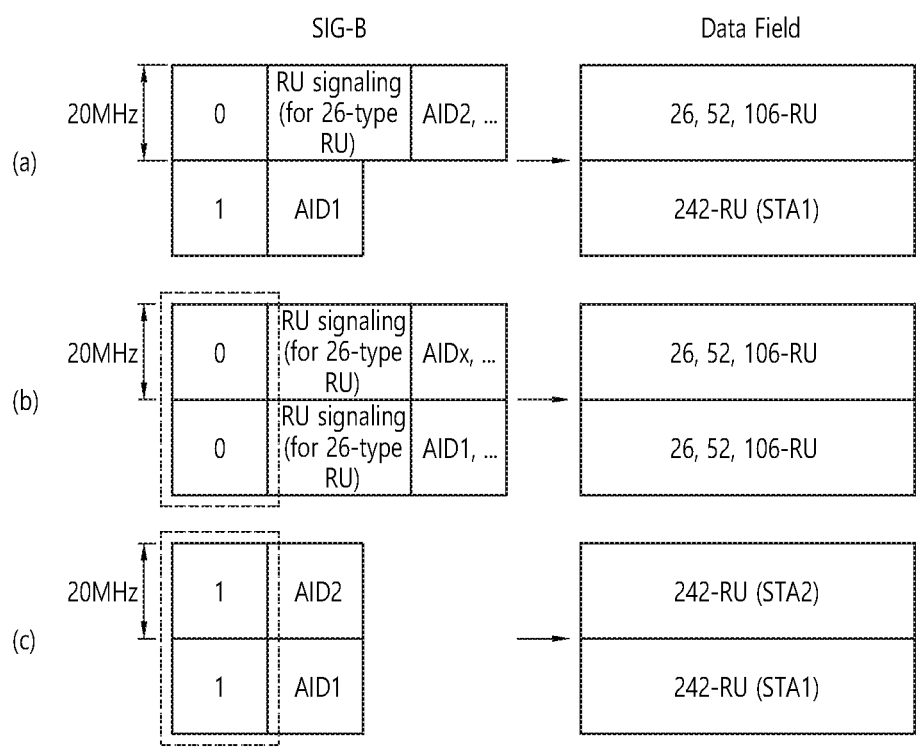
FIG. 12 illustrates an example of the present embodiment for 40 MHz transmission.

FIG. 12 illustrates an example of the present embodiment for 40 MHz transmission.

A left block of FIG. 12 indicates information corresponding to a first and/or second control field. For convenience, it is described hereinafter that the left block of FIG. 12 corresponds to the second control field (i.e., SIG-B), and a right block of FIG. 12 corresponds to a data field of a PPDU.

As illustrated, each control field and the data field correspond to a 20 MHz band.

In the example of FIG. 12, if the aforementioned control identifier (e.g., 1-bit identifier) is set to "1", allocation information for an RU may be omitted. In the example of FIG. 12, the control identifier (e.g., 1-bit identifier) may indicate whether a 242-RU (or 242-type RU) is used.

Referring to FIG. 12, the control identifier is included in a front portion of a common field of the SIG-B. In the example of FIG. 12, the control identifier may be called a "242 unit bitmap". The same advantage as in FIG. 11 can be achieved in a sense that RU allocation information can be omitted according to the "242 unit bitmap", and also an overhead decrease effect can be achieved.

If only the 242-RU is allocated in all 40 MHz channels, the "242 unit bitmap" may be set to "1". Referring to the subfigure (b) of FIG. 12, if only the 26-type RU is allocated in the 40 MHz channel, the "242 unit bitmap" may be set to "00". Referring to the subfigure (c) of FIG. 12, if only the 242-RU is allocated in all 40 MHz channels, the "242 unit bitmap" may be set to "11". Since a last symbol of an SIG-B part needs to be aligned with a longest SIGB symbol of 20 MHz channels, an overhead decrease effect is small when RU allocation information is omitted only in any one 20 MHz channel. Accordingly, if only the 242-RU is allocated in all 20 MHz channels, an example is also possible in which the "242 unit bitmap" is set to "1".

Hereinafter, another example for the aforementioned control identifier (e.g., 1-bit identifier) is proposed. More specifically, it is proposed an example in which the aforementioned control identifier is classified into two identifiers. That is, the proposed identifier includes a first identifier indicating whether a 242-type RU is allocated for each 20 MHz channel and a second identifier indicating whether a 484-RU (or a different sized 242 type RU) is allocated in a corresponding 20 MHz.

Further, an improved example is proposed in regards to a frequency mapping relation between the second control field (i.e., SIG-B) and the data field. Although an additional example for the frequency mapping between the second control field (i.e., SIG-B) and the data field is also applicable to the aforementioned example (i.e., the example of FIG. 11 or FIG. 12), the following description is based on the example of FIG. 13 for convenience of explanation.

Figure 13:
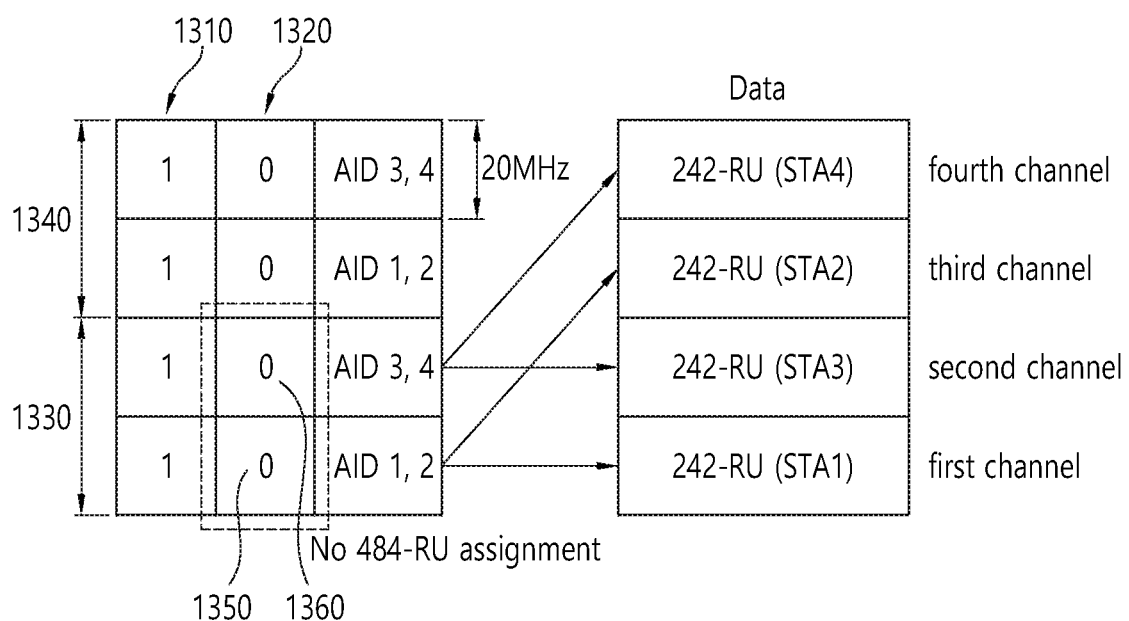
FIG. 13 illustrates an example in which the present specification is applied to 80 MHz transmission.

FIG. 13 illustrates an example in which the present specification is applied to 80 MHz transmission.

In the example of FIG. 13, a first identifier 1310 is configured for each 20 MHz channel. That is, four 1-bit identifiers may be inserted to indicate whether a 242-type RU is allocated for each 20 MHz. In this case, since a 484-RU may be allocated in an 80 MHz band, an additional identifier indicating whether a specific 20 MHz channel (i.e., 242 chunk) is used for the 242-RU or is used for the 484-RU, that is, the aforementioned second identifier 1320, may be additionally included. If both of the first and second identifiers are used, total 8-bit information may be used for the first/second identifiers in the 80 MHz band.

The first and second identifiers may also be expressed as a "242 unit bitmap" and a "484 unit assignment indication field". The first and second identifiers may also be implemented as a 2-bit field. For example, if a second identifier 1350 corresponding to a first channel and a second identifier 1360 corresponding to a second channel are set to "00", this means that the 484-RU is not allocated in a corresponding PPDU. For example, if the first and second identifiers are set to "1" and "0", it may indicate that only the 242-RU is allocated.

The example of FIG. 13 relates to the first identifier 1310 and second identifier 1320 as illustrated. However, an example for a frequency mapping relation between the second control field (i.e., SIG-B) and the data field may be additionally applied.

More specifically, the second control field (i.e., SIG-B) may be configured separately for each 20 MHz channel. However, the present specification proposes an example of independently configuring lower two 20 MHz channels 1330 and upper two 20 MHz channels 1340. More specifically, an example is proposed in which the SIG-B corresponding to the upper or lower two 20 MHZ channels is configured and is then duplicated to be used for the remaining two 20 MHz channels.

All or some parts of the field proposed in the present specification, for example, the SIG-B, are preferably configured according to the aforementioned duplication method. For example, if four 20 MHz channels shown in the example of FIG. 13 are classified into first to fourth channels in an orderly manner from bottom to top, an SIG-B included in the first and second channels may have the same content as an SIG-B included in the third and fourth channels. In this case, it is assumed that the first channel has a lowest frequency index, and the second to fourth channels are located in an ascending order. Further, as illustrated, an SIG-B corresponding to the second channel first displays an AID3 corresponding to an STA3, and thereafter displays an AID4 corresponding to an STA4. Accordingly, the SIG-B corresponding to the second channel may allocate the STA3 to a data field corresponding to the second channel, and may allocate the STA4 to a data field corresponding to the fourth channel. That is, the SIG-B corresponding to the second channel may first indicate STA identification information regarding the data field corresponding to the second channel, and thereafter may indicate STA identification information regarding the data field corresponding to the fourth channel.

In addition, referring to FIG. 13, the SIG-B corresponding to the first channel may indicate the data field corresponding to the first channel and indicate an STA (i.e., STA1) allocated to the data field corresponding to the first channel, or may indicate the data field corresponding to the third channel and indicate an STA (i.e., STA2) allocated to the data field corresponding to the third channel. That is, the SIG-B included in the first channel may indicate the STA identification information regarding the data field corresponding to the first channel, and may indicate the STA identification information regarding the data field corresponding to the third channel.

Figure 14:
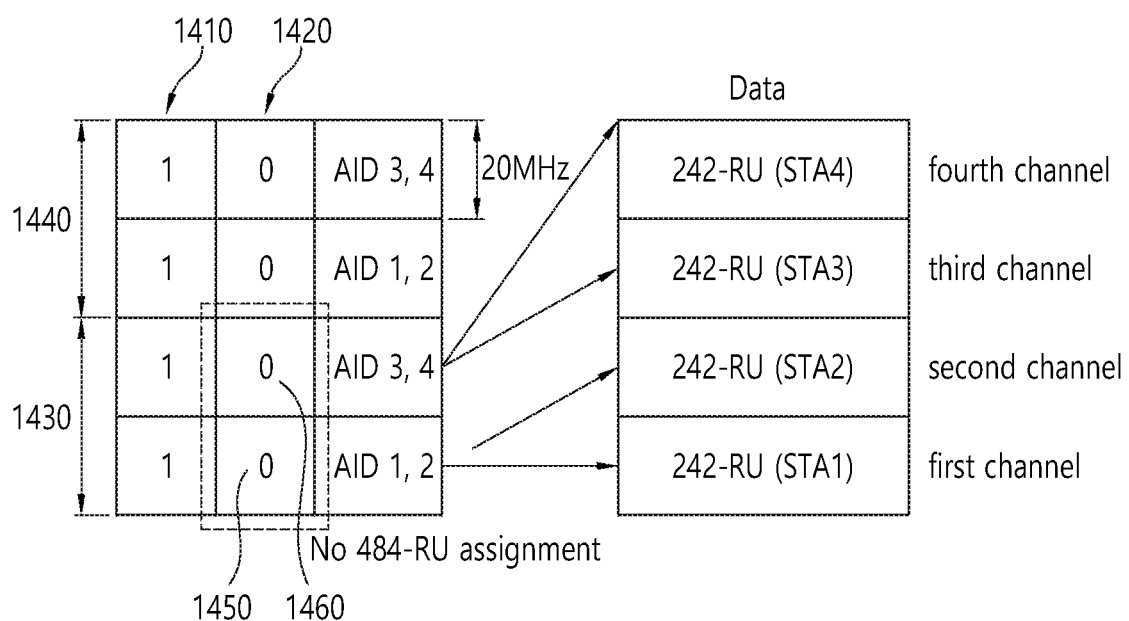
FIG. 14 illustrates an example of modifying a control signal according to the present specification.

FIG. 14 illustrates another example according to the present specification.

Referring to FIG. 14, a first identifier 1410 is included in a head portion of an SIG-B field corresponding to each 20 MHz, followed by a second identifier 1420.

The first/second identifiers of FIG. 14 may be used in the same manner as the first/second identifiers of FIG. 13. Further, the example of FIG. 14 may have a predetermined mapping relation between the SIG-B and the data field similarly to the example of FIG. 13. However, the example of FIG. 14 differs from the example of FIG. 13 in a sense that the SIG-B corresponding to the first channel is mapped to the data field corresponding to the first/second channels, and the SIG-B corresponding to the second channel is mapped to the data field corresponding to the third/fourth channels.

Figure 15:
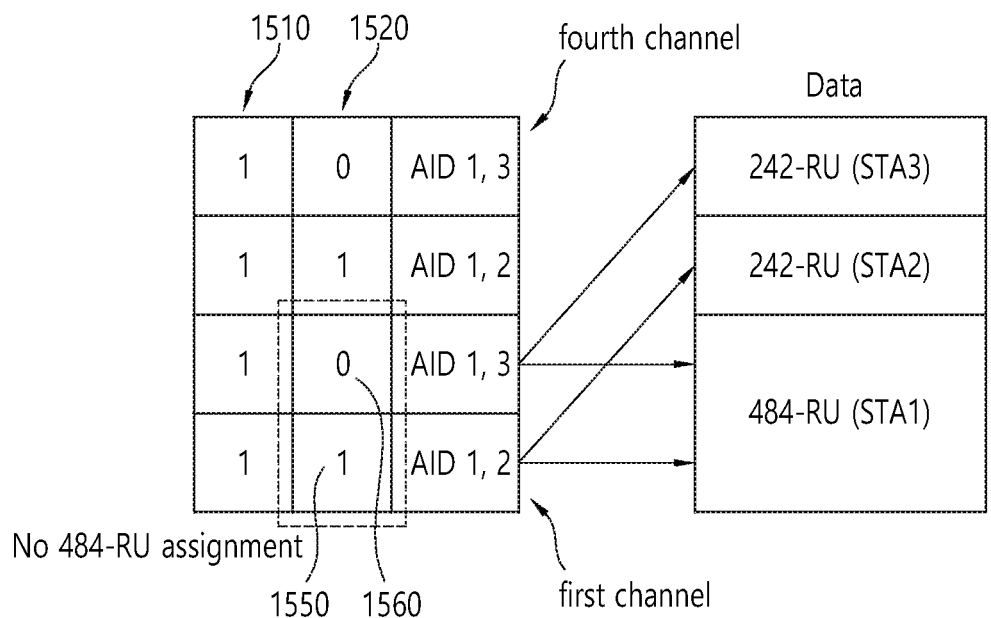
FIG. 15 illustrates an additional example of modifying a control signal according to the present specification.

FIG. 15 illustrates another example according to the present specification.

Referring to FIG. 15, a first identifier 1510 is included in a head portion of an SIG-B field corresponding to each 20 MHz, followed by a second identifier 1520. The first/second identifiers according to the example of FIG. 15 may correspond to the first/second identifiers of FIG. 13 and/or FIG. 14.

As shown in FIG. 15, all or some parts of information of the SIG-B field corresponding to first/second channels may be duplicated to third/fourth channels. That is, as shown in FIG. 15, the SIG-B field corresponding to the first/second channels indicates {AID1, 2} and {AID1, 3}. The SIG-B field corresponding to the third/fourth channels may also indicate {AID1, 2} and {AID1, 3}.

Referring to FIG. 15, a second identifier 1550 corresponding to the first channel indicates "1", and a second identifier 1560 corresponding to the second channel indicates "0". This indicates that a 484-RU is allocated to the first/second channels, and the 484-RU is not allocated to the third/fourth channels. Since all of the first identifiers 1501 are set to 1 in the example of FIG. 15, eventually, in the data field of FIG. 15, a 484-RU is allocated to the first/second channels, a 242-RU is allocated to the third channel, and 282-RU is also allocated to the fourth channel.

Extra other features of FIG. 15 are the same as those in the example of FIG. 13 and FIG. 14.

Figure 16:
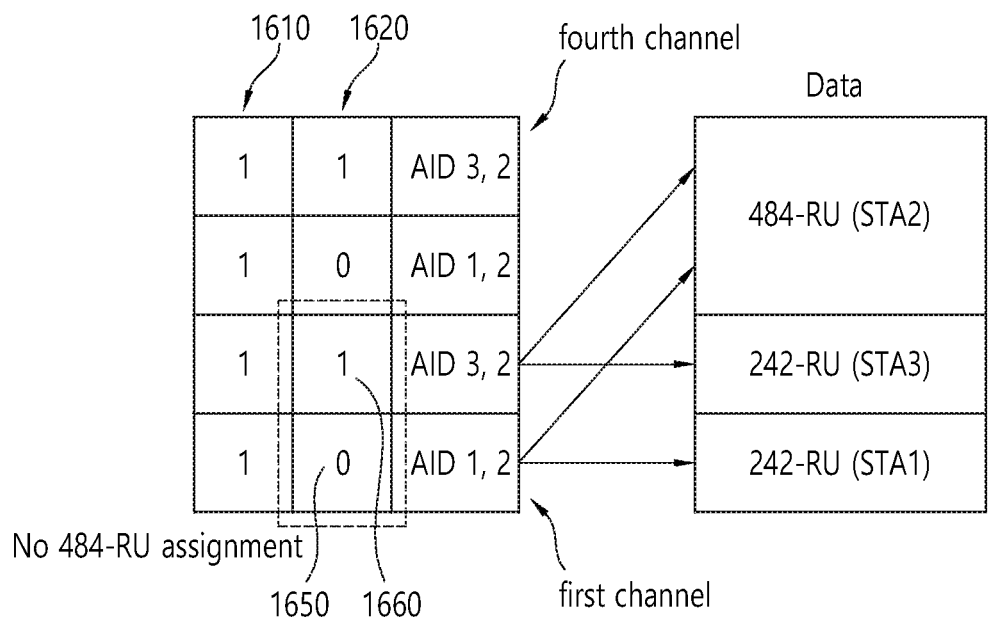
FIG. 16 illustrates an example of modifying a control signal and frequency mapping relation according to the present specification.

FIG. 16 illustrates another example according to the present specification.

Referring to FIG. 16, a first identifier 1610 is included in a head portion of an SIG-B field corresponding to each 20 MHz, followed by a second identifier 1620.

As shown in FIG. 16, all or some parts of information of the SIG-B field corresponding to first/second channels may be duplicated to third/fourth channels. That is, as shown in FIG. 16, the SIG-B field corresponding to the first/second channels indicates {AID1, 2} and {AID3, 2}. The SIG-B field corresponding to the third/fourth channels may also indicate {AID1, 2} and {AID3, 2}.

Referring to FIG. 16, a second identifier 1650 corresponding to the first channel indicates "0", and a second identifier 1660 corresponding to the second channel indicates "1". This indicates that a 484-RU is not allocated to the first/second channels, and the 484-RU is allocated to the third/fourth channels. Since all of the first identifiers 1601 are set to 1 in the example of FIG. 16, eventually, in the data field of FIG. 16, a 242-RU is allocated to the first/second channels, and the 484-RU is allocated to the third/fourth channels.

Extra other features of FIG. 16 are the same as those in the example of FIG. 13 to FIG. 15.

Figure 17:
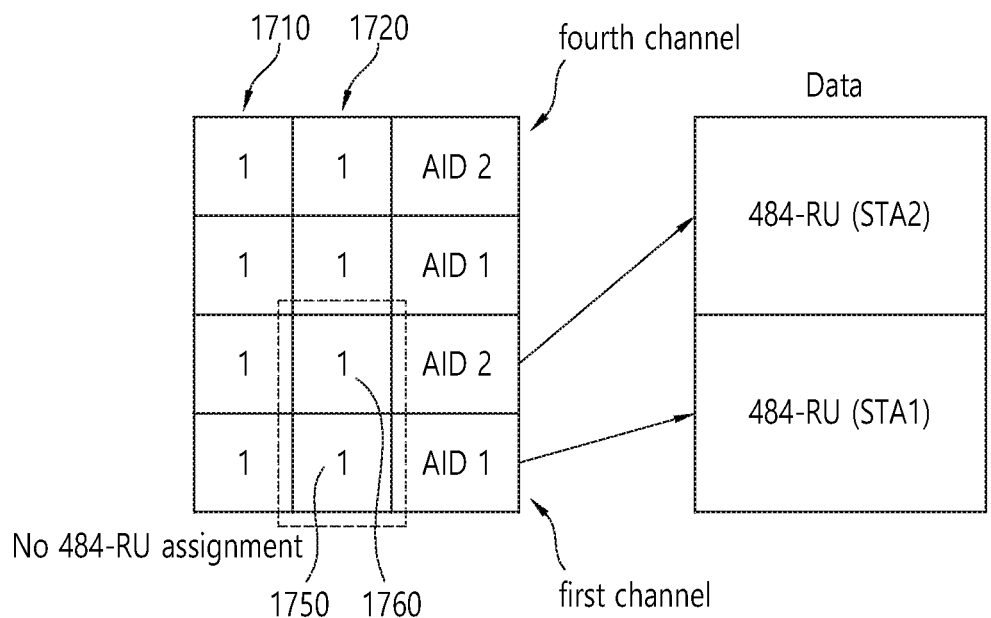
FIG. 17 illustrates an example of modifying a control signal and frequency mapping relation according to the present specification.

FIG. 17 illustrates another example according to the present specification.

Referring to FIG. 17, a first identifier 1710 is included in a head portion of an SIG-B field corresponding to each 20 MHz, followed by a second identifier 1720.

As shown in FIG. 17, all or some parts of information of the SIG-B field corresponding to first/second channels may be duplicated to third/fourth channels. That is, as shown in FIG. 17, the SIG-B field corresponding to the first/second channels indicates {AID1} and {AID2}. The SIG-B field corresponding to the third/fourth channels may also indicate {AID1} and {AID2}.

Referring to FIG. 17, a second identifier 1750 corresponding to the first channel indicates "1", and a second identifier 1760 corresponding to the second channel indicates "1". This indicates that a 484-RU is not allocated to the first/second channels, and the 484-RU is allocated to the third/fourth channels.

Extra other features of FIG. 17 are the same as those in the example of FIG. 13 to FIG. 16.

Figure 18:
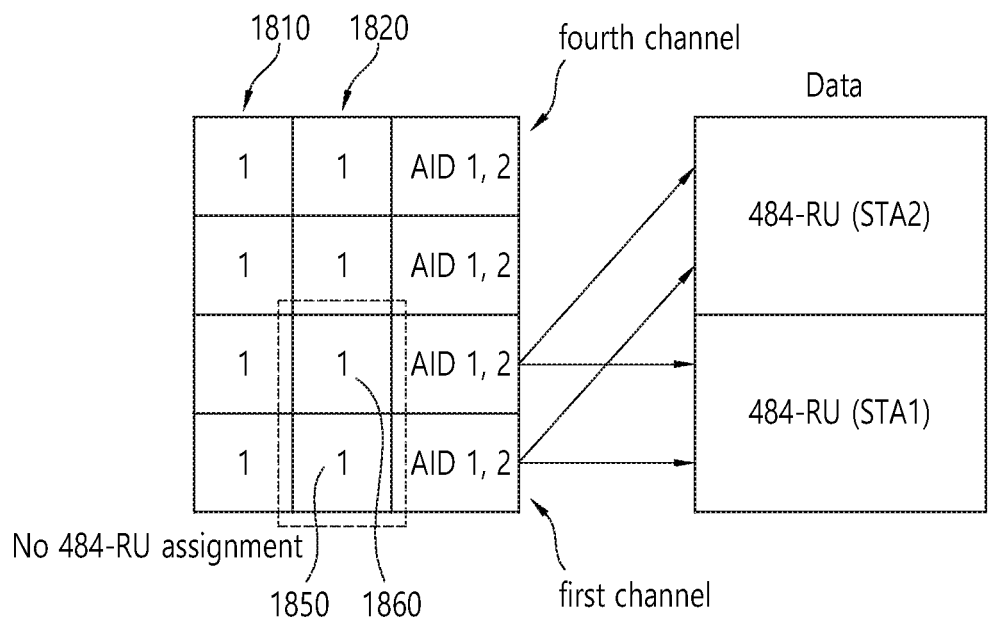
FIG. 18 illustrates an additional example of a control signal and frequency mapping relation according to the present specification.

FIG. 18 illustrates another example according to the present specification.

Referring to FIG. 18, a first identifier 1810 is included in a head portion of an SIG-B field corresponding to each 20 MHz, followed by a second identifier 1820.

As shown in FIG. 18, all or some parts of information of the SIG-B field corresponding to first/second channels may be duplicated to third/fourth channels. That is, as shown in FIG. 18, the SIG-B field corresponding to the first/second channels indicates {AID1, 2} and {AID1, 2}. The SIG-B field corresponding to the third/fourth channels may also indicate {AID1, 2} and {AID1, 2}.

Referring to FIG. 18, a second identifier 1850 corresponding to the first channel indicates "1", and a second identifier 1860 corresponding to the second channel indicates "1". This indicates that a 484-RU is not allocated to the first/second channels, and the 484-RU is allocated to the third/fourth channels.

Extra other features of FIG. 18 are the same as those in the example of FIG. 13 to FIG. 17.

Figure 19:
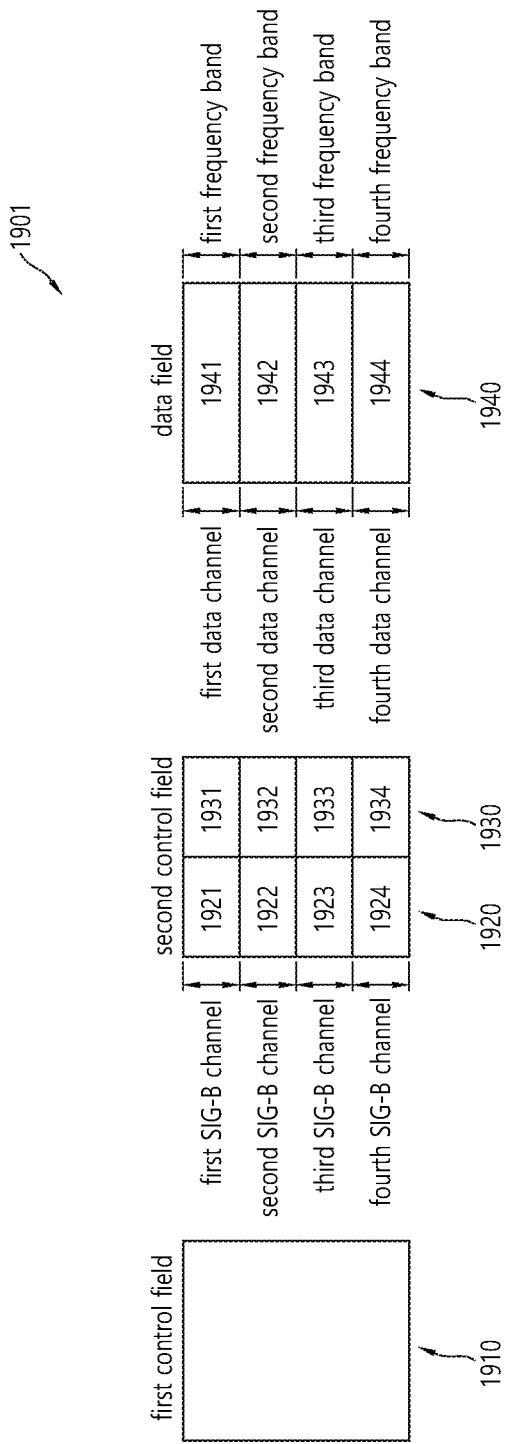
FIG. 19 illustrates a relation of SIG-A, SIG-B, and data fields according to the present embodiment.

FIG. 19 illustrates a relation of SIG-A, SIG-B, and data fields according to the present embodiment. The aforementioned content is described on one PPDU in an example of FIG. 19.

A PPDU 1901 of FIG. 19 may include all or some parts of the field shown in FIG. 7. More specifically, as illustrated, it may include a first control field 1910, second control fields 1920 and 1930, and a data field 1940. The first control field 1910 may correspond to the aforementioned SIG-A or HE-SIG-A, and the second control field 1920 may correspond to the aforementioned SIG-B or HE-SIG B.

The first control field 1910 may include the HE-SIG A 730 of FIG. 7 and a technical feature shown in FIG. 11 to FIG. 18. More specifically, the first control field 1910 may include control information for interpreting the PPDU 1901. For example, as described in the example of FIG. 7, the PPDU 1901 may include a sub-field indicating a transmission frequency band at which the PPDU 1901 is transmitted (i.e., indicating 20 MHz, 40 MHz, 80 MHz, 160 MHz, etc.).

Further, a control identifier (e.g., a first identifier and/or a second identifier) described in FIG. 11 to FIG. 18 may be included. More specifically, the first control field 1910 may include a 1-bit identifier indicating whether a single RU corresponding to a full bandwidth of the transmission frequency band is allocated. If the control identifier (e.g., 1-bit identifier) of the first control field 1910 is set to "1", it indicates that a single RU corresponding to the full bandwidth of the transmission frequency band is allocated. That is, if the transmission frequency band is a 20 MHz band, it indicates that a single 242-RU is allocated, and for example, if the transmission frequency band is an 80 MHz band, it indicates that a single 996-RU is allocated. Meanwhile, as described above, the 1-bit identifier has a technical advantage in that signaling for full bandwidth MU-MIMO is possible.

If the example of FIG. 19 is applied to 80 MHz transmission, the first control field 1910 may be included in the PPDU 1901 in such a manner of being generated in unit of 20 MHz and thereafter being duplicated on the basis of the transmission frequency band. That is, the first control field 1910 may be generated in unit of 20 MHz, and may be duplicated according to an 80 MHz band.

The second control field may correspond to the HE-SIG B field including the common field and user specific field shown in FIG. 8. That is, the second control field may include the common field 1920 and the user specific field 1930. As described above, common information such as RU allocation information for a user may be included in the common field 1920 of the SIG-B. For example, RU allocation information having a form of a look-up table including specific n-bit mapping information may be included. The RU allocation information may indicate arrangement or allocation information of an RU applied to the corresponding data field 1940. That is, a structure in which a plurality of RUs are arranged may be indicated as shown in FIG. 4 to FIG. 6. All STAs which have received the common field 1920 of the second control field may confirm a specific RU by which the corresponding data field 1940 is configured.

In summary, the second control field generally includes allocation information for a resource unit (RU) through the common field 1920. However, if a control identifier (e.g., 1-bit identifier) included in the first control field 1910 is set to "1", the allocation information for the RU is preferably omitted. That is, the common field 1920 may be omitted. Since only a single RU is used when the control identifier is set to "1", there is no need to configure allocation information for the RU, and thus the common field 1920 can be omitted. In other words, if the control identifier (e.g., 1-bit identifier) included in the first control field 1910 is set to "0", the common field 1920 of the second control field may include allocation information for the RU, and if the control identifier (e.g., 1-bit identifier) included in the first control field 1910 is set to "1", the common field 1920 of the second control field may not include the allocation information of the RU.

Meanwhile, the user-specific field 1930 of the second field may include identification information (e.g., AID) for a user STA as shown in FIG. 8.

The second control fields 1920 and 1930 are used to demodulate the data field 1940. In this case, the second control field and the data field 1940 may have a mapping relation as shown in FIG. 13 to FIG. 18.

For example, if the example of FIG. 19 relates to 80 MHz transmission, the second control field may correspond to first to fourth SIG-B channels. That is, the channel may be classified into four channels in unit of 20 MHz.

In this case, the content of second control fields 1921 and 1931 corresponding to the first SIG-B channel may be the same as the content of second control fields 1912 and 1933 corresponding to the third SIG-B channel. In other words, some parts of the second control field may be duplicated in the PPDU 1901. The duplication for the second control field may be implemented in various manners.

For convenience of explanation, four second control fields corresponding to the first to fourth SIG-B channels may be called first, second, third, and fourth signal fields. In this case, second signal fields 1922 and 1932 may be duplicated to construct fourth signal fields 1924 and 1934. That is, the content of the second control fields 1922 and 1932 corresponding to the second SIG-B channel may be the same as the content of the second control fields 1924 and 1934 corresponding to the fourth SIG-B channel.

When such a duplication is performed, the first signal fields 1921 and 1931 may correspond to a data field 1941 of the first data channel and a data field 1943 of the third data channel. Further, the second signal fields 1922 and 1932 may correspond to a data field 1942 of the second data channel and a data field 1944 of the fourth data channel.

In other words, the common field 1921 included in the first signal fields 1921 and 1931 may indicate allocation information for an RU applied to the data field 1941 of the first data channel and allocation information for an RU applied to the data field 1943 of the third data channel. In this case, the allocation information for the RU applied to the data field 1941 of the first data channel is first inserted in a form of one BCC block in the first signal fields 1921 and 1931, and thereafter one BCC block for the data field 1943 of the third data channel is inserted.

Further, the user specific field 1931 included in the first signal fields 1921 and 1931 may include identification information (e.g., AID) of an STA allocated to the data field 1941 of the first data channel and identification information (e.g., AID) of an STA allocated to the data field 1943 of the third data channel. In this case, the aforementioned two BCC blocks are inserted into the first signal fields 1921 and 1931 and then an BCC block for an STA allocated to the data field 1941 of the first data channel is inserted. Thereafter, a BCC block for an STA allocated to the data field 1943 of the third data channel is inserted.

In FIG. 19, although a frequency band at which the second control fields 1920 and 1930 are transmitted is indicated by four "SIG-B channels" and a frequency band at which the data field 1940 is transmitted is indicated by four "data channels", it may be interpreted that each SIG-B channel and data channel correspond to the four frequency bands described in FIG. 7. That is, as described in the example of FIG. 7, each boundary surface of the data channel and each boundary surface of the SIG-B channel may not be completely aligned. However, when it is described based on a corresponding 20 MHz frequency band, the second control fields 1921 and 1931 corresponding to a first frequency band correspond to the two data fields 1941 and 1943 corresponding to the first/third frequency bands. Further, the second control fields 1922 and 1932 corresponding to the second frequency band correspond to the two data fields 1942 and 1944 corresponding to the second/fourth frequency bands.

Figure 20:
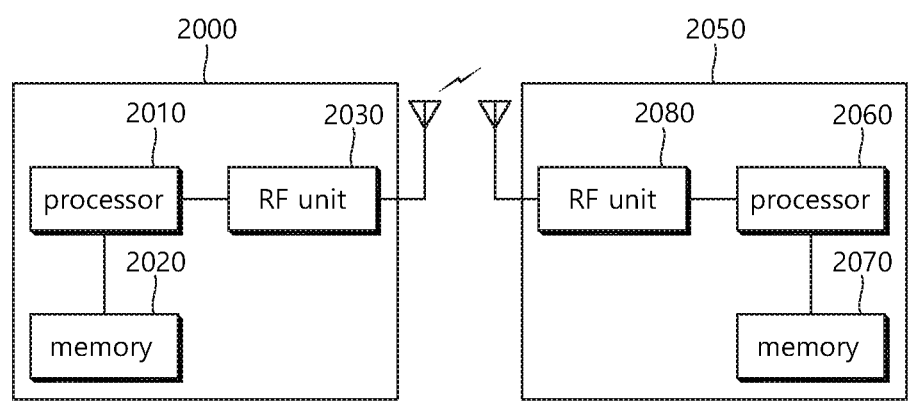
FIG. 20 is a block diagram illustrating a wireless device to which the present embodiment is applicable.

FIG. 20 is a block diagram illustrating a wireless device to which the present embodiment is applicable.

Referring to FIG. 20, a wireless device is an STA capable of implementing the aforementioned embodiment, and may be an AP 2000 or a non-AP STA. The wireless device may correspond to the aforementioned user, or may correspond to a transmission device for transmitting a signal to the user.

The AP 2000 includes a processor 2010, a memory 2020, and a radio frequency (RF) unit 2030.

The RF unit 2030 may be coupled to the processor 2010 to transmit/receive a radio signal.

The processor 2010 may implement the functions, procedures, and/or methods proposed in the present specification. For example, the processor 2010 may be configured to perform an operation according to the aforementioned embodiment. That is, the processor 2010 may perform an operation that can be performed by the AP among operations disclosed in the embodiment of FIG. 1 to FIG. 19.

A non-AP STA 2050 includes a processor 2060, a memory 2070, and an RF unit 2080.

The RF unit 2080 may be coupled to the processor 2060 to transmit/receive a radio signal.

The processor 2060 may implement the functions, procedures, and/or methods proposed in the present invention. For example, the processor 2060 may be configured to perform an operation of the non-AP STA according to the aforementioned embodiment. The processor may perform the operation of the non-AP STA disclosed in the embodiment of FIG. 1 to FIG. 19.

The processors 2010 and 2060 may include application-specific integrated circuits (ASICs), other chipsets, logical circuits, data processing devices, and/or converters for mutually converting a baseband signal and a radio signal. The memories 2020 and 2070 may include a read-only memory (ROM), a random access memory (RAM), a flash memory, a memory card, a storage medium and/or other storage devices. The RF units 2030 and 2080 may include at least one antenna to transmit and/or receive the radio signal.

When the above-described embodiment is implemented in software, the above-described scheme may be implemented using a module (procedure, function, etc.) which performs the above function. The module may be stored in the memories 2020 and 2070, and may be executed by the processors 2010 and 2060. The memories 2020 and 2070 may be disposed to the processors 2010 and 2060 internally or externally, and may be connected to the processors 2010 and 2060 using a variety of well-known means.

What is claimed is:

1. A method in a wireless local area network (WLAN) system, comprising:
    generating a physical layer protocol data unit (PPDU) including a first control field, a second control field, and a data field; and
    transmitting the PPDU to at least one station through a transmission frequency band including at least one resource unit (RU),
    wherein the first control field includes a first sub-field having 1-bit length,
    wherein the first sub-field is related to whether a single RU to be transmitted through a full bandwidth of the transmission frequency band is allocated in the PPDU,
    wherein the first control field further includes a second sub-field for the transmission frequency band,
    wherein the second control field includes identification information for the at least one station, and
    wherein presence of a RU signaling field related to allocation of the at least one RU in the second control field is determined based on whether the single RU is allocated in the PPDU, and the RU signaling field is not present in the second control field for the single RU being allocated in the PPDU.

2. The method of claim 1, wherein the first control field is a high efficiency signal A (HE SIG-A) field, and the second control field is a high efficiency signal B (HE SIG-B) field.

3. The method of claim 1, wherein the transmission frequency band is at least one of 20 MHz, 40 MHz, 80 MHz, or 160 MHz bands.

4. The method of claim 1, wherein the first control field is followed by the second control field in the PPDU.

5. The method of claim 1, wherein the identification information includes an association identifier (AID) of the at least one station.

6. The method of claim 1, wherein a frequency band corresponding to the RU is contained in the transmission frequency band.

7. The method of claim 1, wherein the RU includes at least one of 26, 52, 106, 242, 484, or 996 subcarriers.

8. A transmitting device of a wireless local area network (WLAN) system, comprising:
    a radio frequency (RF) unit including at least one antenna to transmit a radio signal over a transmission frequency band including at least one resource unit (RU); and
    a processor operatively coupled to the RF unit,
    wherein the processor is configured for:
    generating a physical layer protocol data unit (PPDU) including a first control field, a second control field, and a data field; and
    instructing the RF unit to transmit the PPDU to at least one station through a transmission frequency band,
    wherein the first control field includes a first sub-field having 1-bit length,
    wherein the first sub-field is related to whether a single RU to be transmitted through a full bandwidth of the transmission frequency band is allocated in the PPDU,
    wherein the first control field further includes a second sub-field for the transmission frequency band,
    wherein the second control field includes identification information for the at least one station, and
    wherein presence of a RU signaling field related to allocation of the at least one RU in the second control field is determined based on whether the single RU is allocated in the PPDU, and the RU signaling field is not present in the second control field for the single RU being allocated in the PPDU.

9. The transmitting device of claim 8, wherein the first control field is a high efficiency signal A (HE SIG-A) field, and the second control field is a high efficiency signal B (HE SIG-B) field.

10. The transmitting device of claim 8, wherein the transmission frequency band is at least one of 20 MHz, 40 MHz, 80 MHz, and 160 MHz bands.

11. The transmitting device of claim 8, wherein the first control field is followed by the second control field in the PPDU.

12. The transmitting device of claim 8, wherein the identification information includes an association identifier (AID) of the at least one station.

13. The transmitting device of claim 8, wherein a frequency band corresponding to the RU is contained in the transmission frequency band.

14. The transmitting device of claim 8, wherein the RU includes at least one of 26, 52, 106, 242, 484, or 996 subcarriers.

15. A receiving device of a wireless local area network (WLAN) system, comprising:
- a radio frequency (RF) unit including at least one antenna to receive a radio signal over a transmission frequency band including at least one resource unit (RU); and
- a processor operatively coupled to the RF unit,
  - wherein the processor is configured for:
    - instructing the RF unit to receive a physical layer protocol data unit (PPDU) including a first control field, a second control field, and a data field; and
    - decoding the data field based on the first control field and the second control field,
  - wherein the first control field includes a first sub-field having 1-bit length,
  - wherein the first sub-field is related to whether a single RU to be received through a full bandwidth of the transmission frequency band is allocated in the PPDU,
  - wherein the first control field further includes a second sub-field for the transmission frequency band,
  - wherein the second control field includes identification information for the at least one station, and
  - wherein presence of a RU signaling field related to allocation of the at least one RU in the second control field is determined based on whether the single RU is allocated in the PPDU, and the RU signaling field is not present in the second control field for the single RU being allocated in the PPDU.

16. The receiving device of claim 15, wherein the first control field is a high efficiency signal A (HE SIG-A) field, and the second control field is a high efficiency signal B (HE SIG-B) field.

17. The receiving device of claim 15, wherein the transmission frequency band is at least one of 20 MHz, 40 MHz, 80 MHz, or 160 MHz bands.

18. The receiving device of claim 15, wherein the first control field is followed by the second control field in the PPDU.

* * * * *

UNITED STATES PATENT AND TRADEMARK OFFICE
CERTIFICATE OF CORRECTION

PATENT NO. : 10,667,242 B2  
APPLICATION NO. : 15/525006  
DATED : May 26, 2020  
INVENTOR(S) : Jinsoo Choi et al.

Page 1 of 1

It is certified that error appears in the above-identified patent and that said Letters Patent is hereby corrected as shown below:

In the Claims

Claim 6, Column 20, Line 27; insert --at least one-- before the term "RU is contained".

Claim 7, Column 20, Line 29; insert --at least one-- before the term "RU includes".

Claim 13, Column 21, Line 5; insert --at least one-- before the term "RU is contained".

Claim 14, Column 21, Line 7; insert --at least one-- before the term "RU includes".

Claim 15, Column 22, Line 8; delete "the" before the term "at least one station, and".

Signed and Sealed this  
Twenty-second Day of October, 2024

Katherine Kelly Vidal  
*Director of the United States Patent and Trademark Office*